United States Patent
Pepper et al.

(10) Patent No.: US 10,877,845 B2
(45) Date of Patent: Dec. 29, 2020

(54) APPARATUS AND METHOD FOR DIAGNOSTIC USE OF BIOS ATTRIBUTES TO REMEDIATE CONFIGURATION ISSUES

(71) Applicant: DELL PRODUCTS, LP, Round Rock, TX (US)

(72) Inventors: Chris E. Pepper, Leander, TX (US); Gregory A. Havenga, Lakeway, TX (US); Michael J. Landrus, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 225 days.

(21) Appl. No.: 16/053,426

(22) Filed: Aug. 2, 2018

(65) Prior Publication Data

US 2020/0042391 A1 Feb. 6, 2020

(51) Int. Cl.
*G06F 11/00* (2006.01)
*G06F 11/14* (2006.01)
*G06F 11/22* (2006.01)
*G06F 9/4401* (2018.01)

(52) U.S. Cl.
CPC ........ *G06F 11/1417* (2013.01); *G06F 9/4406* (2013.01); *G06F 11/2284* (2013.01)

(58) Field of Classification Search
CPC ............. G06F 11/1417; G06F 11/2284; G06F 11/142; G06F 11/2247; G06F 11/2278; G06F 11/2289; G06F 9/4406; G06F 9/44505; G06F 2201/805
See application file for complete search history.

(56) References Cited

U.S. PATENT DOCUMENTS

| | | | |
|---|---|---|---|
| 4,070,704 A * | 1/1978 | Calle | G06F 15/177 713/100 |
| 6,230,285 B1 * | 5/2001 | Sadowsky | G06F 11/1417 714/14 |
| 6,529,966 B1 * | 3/2003 | Willman | G06F 9/4411 710/10 |
| 8,214,541 B2 | 7/2012 | Bolen et al. | |
| 8,504,811 B2 | 8/2013 | Yang et al. | |
| 2005/0229042 A1 * | 10/2005 | Crowell | G06F 11/2284 714/36 |
| 2008/0155331 A1 * | 6/2008 | Rothman | G06F 11/1417 714/36 |
| 2012/0159238 A1 * | 6/2012 | Wang | G06F 11/079 714/6.1 |
| 2012/0297178 A1 | 11/2012 | Peng et al. | |
| 2016/0364250 A1 | 12/2016 | Seibert et al. | |

* cited by examiner

*Primary Examiner* — Joseph D Manoskey
(74) *Attorney, Agent, or Firm* — Larson Newman, LLP

(57) ABSTRACT

An information handling system includes a storage device and a processor. The storage device stores Power-On Self Test (POST) code, diagnostic code, and remediation code. The POST code determines whether an error occurred while booting the information handling system. If an error occurred, the diagnostic code determines whether the error is associated with a configuration setting of the information handling system being in a first state. If the error is associated with the configuration setting being in the first state, the remediation code changes the first configuration setting from the first state to a second state, and reboots the information handling system.

16 Claims, 4 Drawing Sheets

APPARATUS AND METHOD FOR DIAGNOSTIC USE OF BIOS ATTRIBUTES TO REMEDIATE CONFIGURATION ISSUES

FIELD OF THE DISCLOSURE

This disclosure generally relates to information handling systems, and more particularly relates to the diagnostic use of BIOS attributes to remediate configuration issues.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A POST code may determine whether an error occurred while booting an information handling system. If an error occurred, diagnostic code may determine whether the error is associated with a configuration setting of the information handling system being in a first state. If the error is associated with the configuration setting being in the first state, remediation code may change the first configuration setting from the first state to a second state, and reboot the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
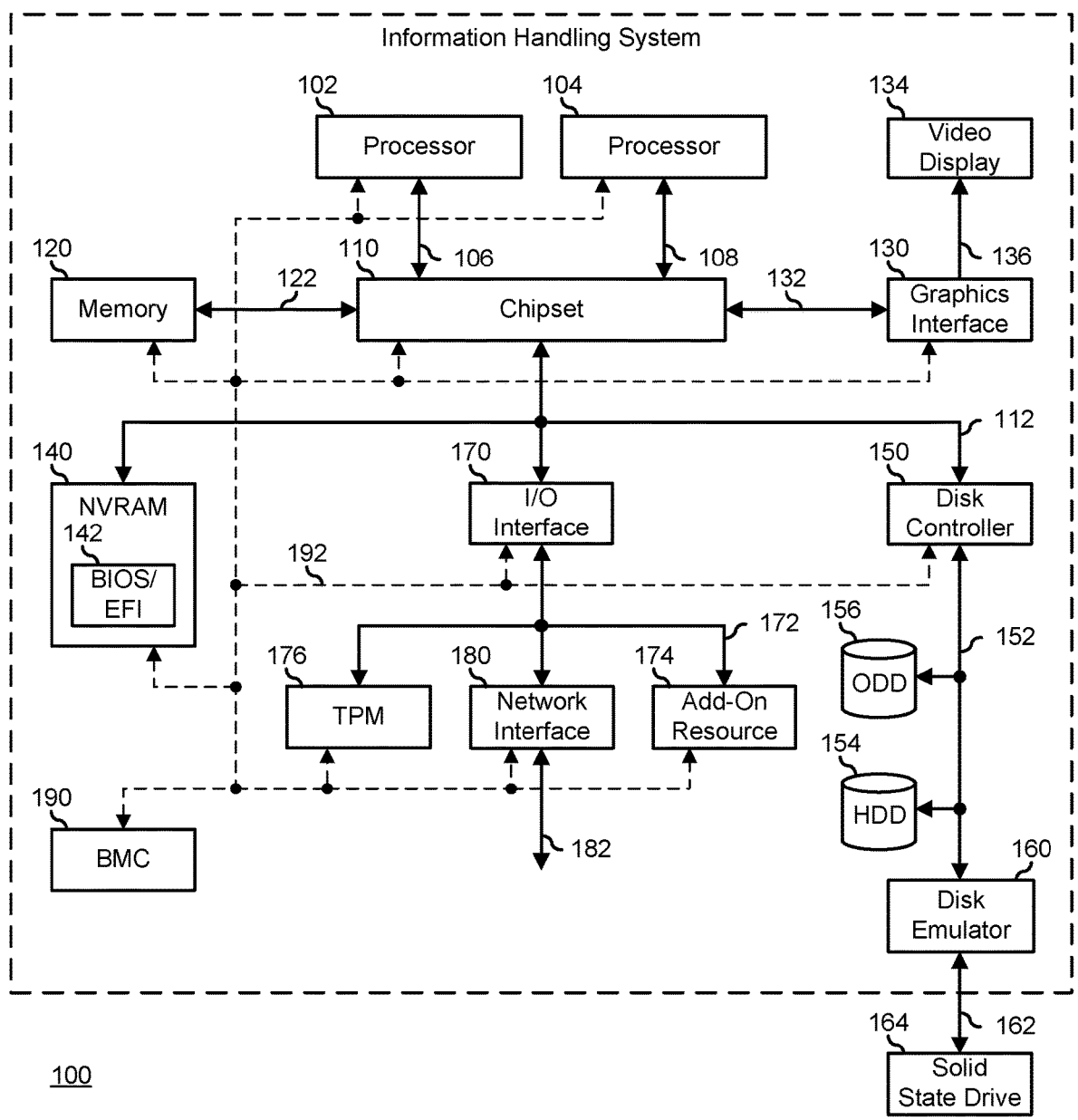
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. An example of network channel 182 includes an InfiniBand channel, a Fibre Channel channel, a Gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC) or other embedded controller. Management interface 192 represents an out of band communication interface to between BMC 190 and the elements of information handling system 100, and can include an Inter-Integrated Circuit (I2C) bus, a System Management Bus (SMBUS), a Power Management Bus (PMBUS), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

Figure 2:
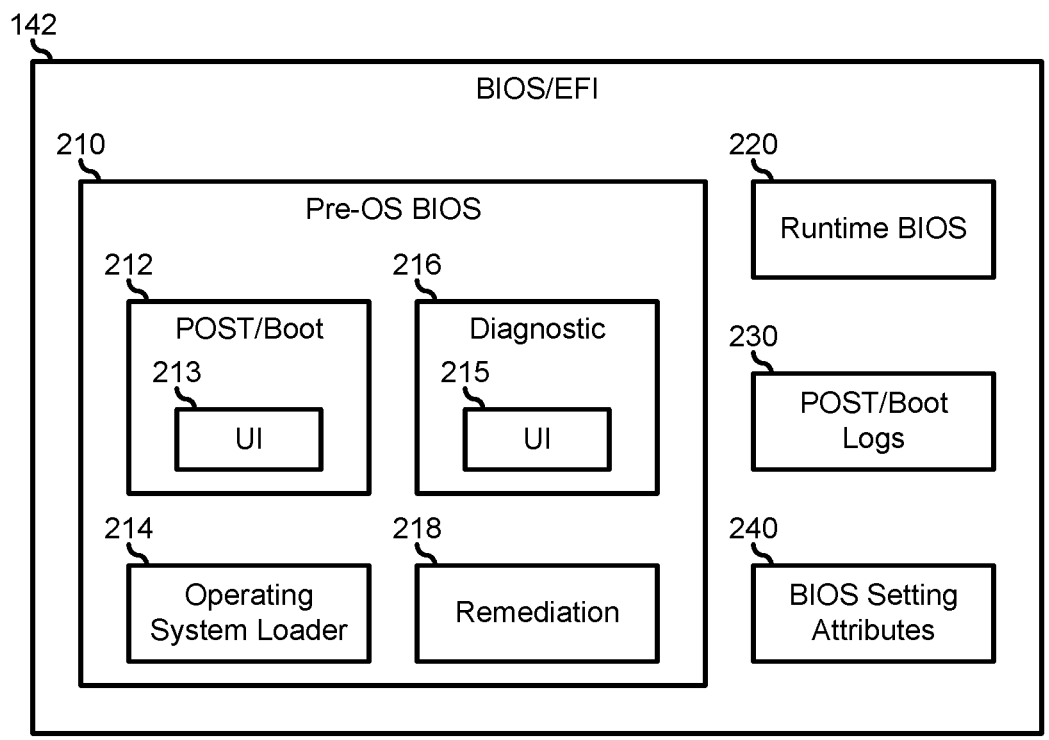
FIG. 2 is a block diagram of BIOS/EFI code of the information handling system of FIG. 1.

FIG. 2 illustrates BIOS/EFI module 142 that includes pre-operating system (OS) BIOS code, runtime BIOS code 220, POST/boot logs 230, and BIOS setting attributes 240. Pre-OS code 210 represents a portion of system BIOS that operates to detect the resources of information handling system 100, to provide drivers for the resources, and to initialize the resources. Pre-OS code 210 includes Power-On Self Test (POST)/boot code 212, OS loader code 214, diagnostic code 216, and remediation code 218. POST/boot code 212 operates immediately upon a reset condition of information handling system 100 and performs the operations needed to detect and initialize the resources of the information handling system in preparation for booting an operating system (OS) on the information handling system. For example, POST/boot code 212 can operate to verify the integrity of the POST/boot code itself, to verify processor registers and the resources of the information handling system, to discover the size of the system memory, to initialize the system memory, to discover and launch extension BIOSes (e.g., option ROMs), to discover, initialize, and catalog system busses and interfaces, and to provide a user interface 213 for configuring the available POST/boot options. In operation, POST/boot code 212 utilizes BIOS setting attributes 240 to determine and apply various userselectable configuration options. An example of BIOS setting attributes includes various "CMOS settings" or "BIOS settings."

Upon successful completion of the functions and procedures of POST/boot code 212, the POST/boot code operates to pass control of information handling system 100 to OS loader 214 to launch an OS on information handling system 100, and runtime BIOS 220 operates to provide the common access mechanisms for the resources of information handling system 100 to the OS. During the operation of OS loader 214, POST/boot code 212 continues to monitor the operation of the OS loader to determine whether or not the OS was successfully loaded, and if errors in loading the OS are detected, the BIOS/boot code operates to pass control of information handling system 100 to diagnostic code 216, as described below.

If POST/boot code 212 detects any anomalies or errors in the process of booting information handling system 100, the POST/boot code operates to provide an indication as to the nature of the anomaly or error. For example, POST/boot code can provide a POST "beep code" or a port 80 write with a "POST code." Further, POST/boot code 212 operates to write a log of anomalies or errors that are detected in the process of booting information handling system 100 to POST/boot logs 230. If POST/boot code 212 is able to complete the POST/boot process, in spite of the detection of anomalies or errors, the POST/boot code operates to pass control of information handling system 100 to diagnostic code 216. An example of an anomaly or boot process error includes a secure boot failure, a boot order failure, a legacy mode/EFI mode error, a disabled disk drive failure, a legacy option-ROM detect or install failure, a driver detect or install failure, a UEFI network enabled/disabled error, a BIOS/UEFI firmware update failure, a TPM detect or authentication failure, or the like.

Figure 3:
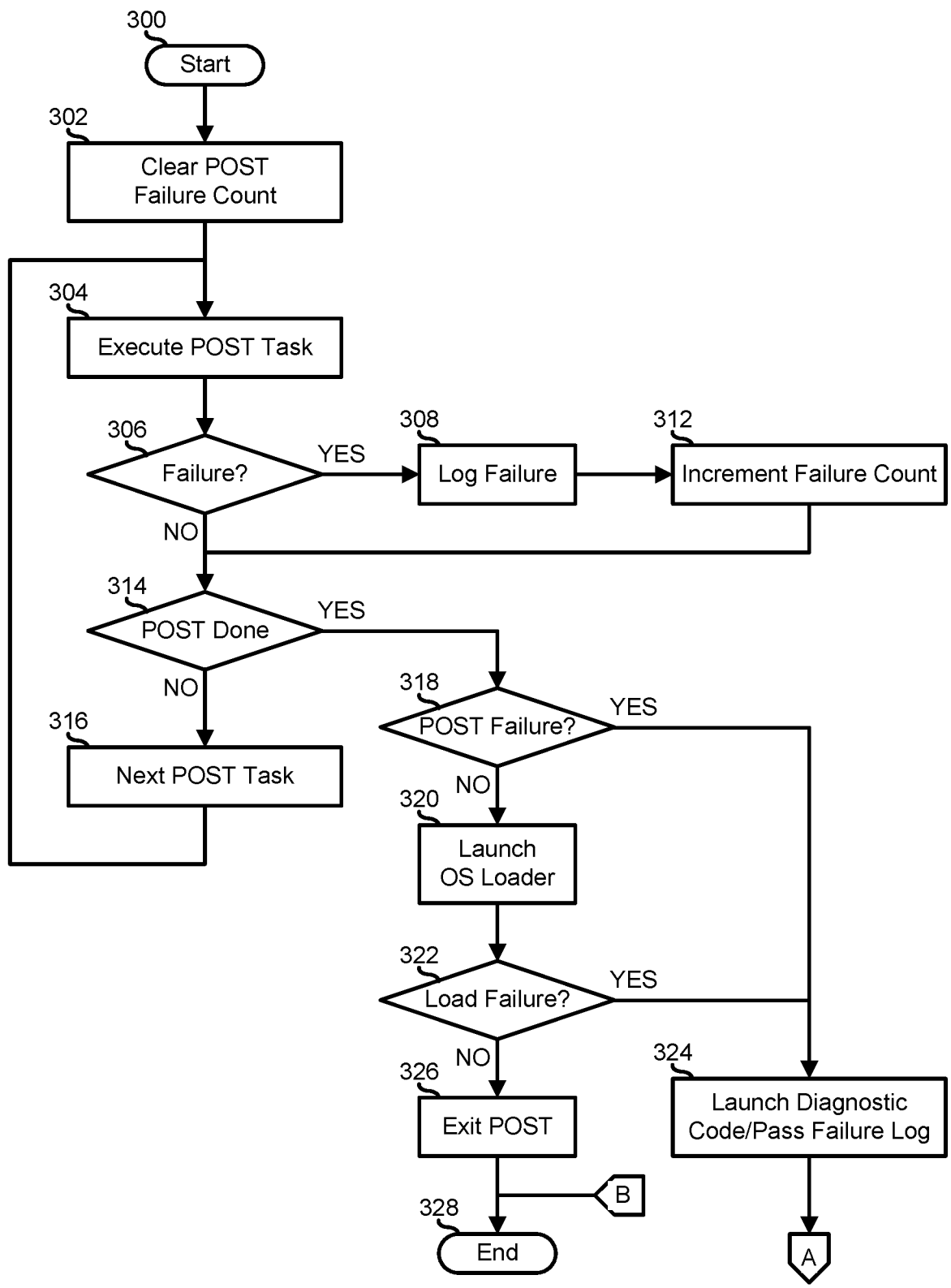
FIGS. 3 and 4 are flowcharts of a method for the diagnostic use of BIOS attributes to remediate configuration issues according to an embodiment of the present disclosure.
Figure 4:
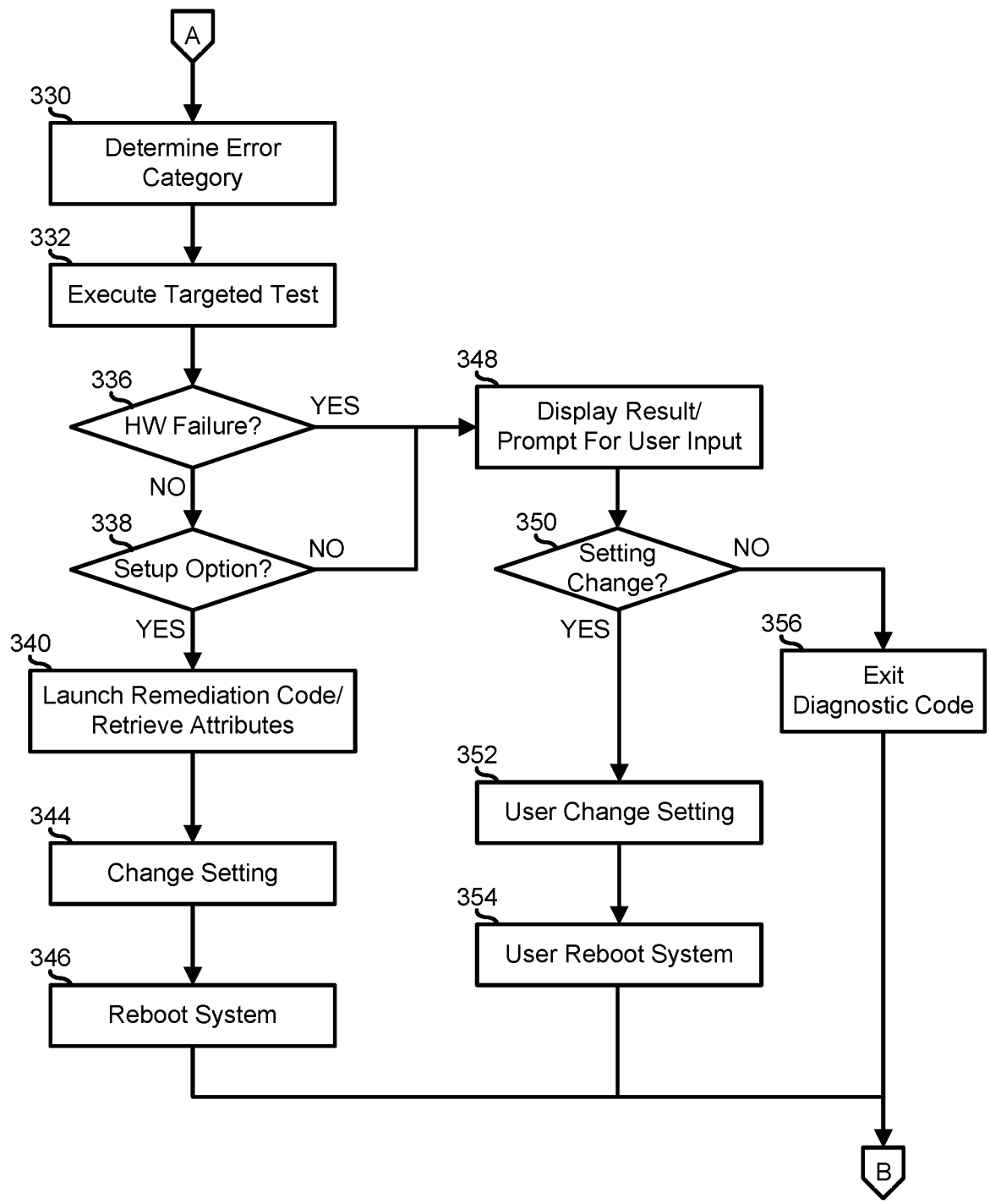

FIGS. 3 and 4 illustrate a method for diagnostic use of bios attributes to remediate configuration issues in an information handling system, starting at block 300. An information handling system begins operation after a system reset and clears a POST failure count in block 302 and begins the POST process by executing a first POST task in block 304. A decision is made as to whether or not the POST task was successfully performed, that is, whether or not the POST task resulted in a failure, in decision block 306. If not, the "NO" branch of decision block 306 is taken and the method proceeds to decision block 314 as described below. If the POST task resulted in a failure, the "YES" branch of decision block 306 is taken, the failure is logged in block 308, the failure count is incremented in block 312, and the method proceeds to decision block 314.

When the POST task was successfully performed, as determined in decision block 306, or after the failure count is incremented in block 312, a decision is made as to whether or not the POST task was the last POST task, that is, whether or not the POST process is done, in decision block 314. If not, the "NO" branch of decision block 314 is taken, a next POST task is selected in block 316, and the method returns to block 304 where the next POST task is executed. If the POST process is done, the "YES" branch of decision block 314 is taken and a decision is made as to whether or not the POST process resulted in any failures in decision block 318. If so, the "YES" branch of decision block 318 is taken and the method proceeds to block 324 as described below. If the POST process did not result in any failures, the "NO" branch of decision block 318 is taken and the OS loader is launched in block 320. A decision is made as to whether or not the OS load failed in decision block 322. If so, the "YES" branch of decision block 322 is taken and the method proceeds to block 324 as described below. If the OS load did not fail, the "NO" branch of decision block 322 is taken, the POST process is exited and the BIOS hands control of the information handling system to the OS in block 326, and the method ends in block 328.

If the POST process resulted in any failures, as determined in decision block 318, or if the OS load failed, as determined in decision block 322, the diagnostic code is launched and the failure log is passed to the diagnostic code in block 324. An error category is determined for an error identified in the error log in block 330, and a test that is targeted by the diagnostic code as being related to the error category is executed in block 332. For example, BIOS/EFI module 142 may send a category "OS Boot Failure" when the Load Failure is detected in block 322. This may result in diagnostic code 216 examining resources such as memory 120, disk controller 150, and HDD 154 resources to determine if a hardware reason exists for the OS boot problem. Thus, diagnostic code 216 is designed to verify the hardware state of information handling system 100. In another example, BIOS/EFI module 142 may send a category "Fan Failure" when the failure decision logic determines that cooling components are not working as expected. In this instance, diagnostic code 216 may execute all available fan tests for all possible fan sources populated in the information handling system. In yet another example, BIOS/EFI module 142 may send a category "Battery Failure" which can occur with mobile information handling systems powered by direct current (DC) power sources. Here, diagnostics code 216 may confirm the health of the physical connection and communication with the battery and charging capability of the AC/DC conversion logic that is responsible for recharging operation. The use of error categories enables diagnostic code 216 to narrow the focus of the available tests to verify the highest probably source of failures with these least amount of time delay.

A decision is made as to whether or not the targeted test identified the failure as a hardware failure in decision block 336. If so, the "YES" branch of decision block 336 is taken and the method proceeds to block 348 as described below. If the targeted test did not identify the failure as a hardware failure, the "NO" branch of decision block 336 is taken and a decision is made as to whether or not the BIOS POST indicated an error category in decision block 338. If not, the "NO" branch of decision block 338 is taken and the method proceeds to block 348 as described below. If the diagnostic code can identify a setup option related to the error category, the "YES" branch of decision block 338 is taken and the remediation code is launched and the setup attribute information is retrieved by the remediation code in block 340.

For example, setup attributes for secure boot, boot order, boot mode (UEFI images or non-UEFI legacy images) and HDD enable/disable can be possible causes for POST errors of category "OS Boot Failure" depending on the information handling system configuration. If the error category can be associated with BIOS setup attributes, the "YES" branch of decision block 342 is taken and diagnostic will display possible option choices for the attribute(s) that could remedy the problem based on current attribute(s) values and the state of the system. Any derived remediation options are displayed to the user without having to transition outside of the diagnostic program. If the user accepts one of the offered remediation solutions, diagnostics will configure the setup attribute appropriately resulting in storage of the new setup attribute value in block 240. The remediation code reboots the information handling system in block 346, and the method ends in block 328.

When the targeted test that was executed in block 332 identified the failure as a hardware failure, as determined in decision block 336, or when the diagnostic code can identify a setup option related to the error category, as determined in decision block 338, the diagnostic code displays a result and prompts the user for an input in block 348. The displayed result can relate to the discovered hardware failure, to the lack of a setup option, or to the fact that a setup option was discovered but that the information handling system was set in a manual remediation mode, depending upon which path was taken to get to block 348. A decision is made as to whether or not the user provided a setting change input in decision block 350. If not, the "NO" branch of decision block 350 is taken, the diagnostic code is exited in block 356, and the method ends in block 328. If the user provided a setting change input, the "YES" branch of decision block 350 is taken, the user sets the setup attribute as determined in decision block 338 to a setting that corrects the anomaly or error in the boot process or the OS launch process in block 352, the user reboots the information handling system in block 354, and the method ends in block 328.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a storage device to store Power-On Self Test (POST) code, diagnostic code, remediation code and operating system (OS) loader code; and
   a processor configured to:
      execute the POST code to boot the information handling system and to determine whether an error occurred during the boot;
      execute the diagnostic code if the error occurred, the diagnostic code to determine whether the error is associated with a first configuration setting of the information handling system being in a first state;
      execute the remediation code if the error is associated with the first configuration setting being in the first state, the remediation code to change the first configuration setting from the first state to a second state, and to reboot the information handling system; and
      execute the OS loader code if no error occurred while booting the information handling system, wherein in executing the OS loader code the processor is further configured execute the POST code to determine whether the OS failed to load during the execution of the OS loader code.

2. The information handling system of claim 1, wherein, when the error is associated with the first configuration setting being in the first state, the processor is further configured to execute the remediation code to determine whether the remediation code is set to an automatic remediation state, and wherein changing the first configuration setting from the first state to the second state is in response to the remediation code being set to the automatic remediation state.

3. The information handling system of claim 2, wherein, when the remediation code is not set to the automatic remediation state, the processor is further configured to provide an indication that the error is associated with the first configuration setting being in the first state.

4. The information handling system of claim 1, wherein, when the error is not associated with the first configuration setting being in the first state, the processor is further configured to provide an indication that the error is not associated with the first configuration setting being in the first state.

5. The information handling system of claim 1, wherein, prior to determining whether the error is associated with the first configuration setting being in the first state, the processor is further configured to execute the diagnostic code to determine whether the error is associated with a hardware device of the information handling system, and wherein determining whether the error is associated with the first configuration setting being in the first state is in response to determining that the error is not associated with the hardware device.

6. The information handling system of claim 5, wherein, when the error is associated with the hardware device, the processor is further configured to provide an indication that the error is associated with the hardware device.

7. The information handling system of claim 1, wherein, if the OS failed to load, the processor is further configured to:
   execute the diagnostic code to determine whether the failure to load the OS is associated with a second configuration setting of the information handling system being in a third state; and
   execute the remediation code when the failure to load the OS is associated with the second configuration setting being in the third state, the remediation code further to change the second configuration setting from the third state to a fourth state, and to reboot the information handling system.

8. The information handling system of claim 7, wherein, when the failure to load the OS is not associated with a second configuration setting being in a third state, the processor is further configured to provide an indication that the OS failed to load.

9. A method for remediating configuration issues in an information handling system, the method comprising:
   determining, by a processor of the information handling system, whether an error occurred while booting the information handling system;
   determining, if the error occurred, whether the error is associated with a first configuration setting of the information handling system being in a first state; and
   changing, if the error is associated with the first configuration setting being in the first state, the first configuration setting from the first state to a second state; and
   rebooting the information handling system in response to changing the first configuration setting;
   executing an operating system (OS) loader code if no error occurred while booting the information handling system; and
   determining, by the processor, whether the OS failed to load while executing the OS loader during the execution of the OS loader code.

10. The method of claim 9, wherein, when the error is associated with the first configuration setting being in the first state, the method further comprises:
   determining whether the remediation code is set to an automatic remediation state, wherein changing the first configuration setting from the first state to the second state is in response to the remediation code being set to the automatic remediation state.

11. The method of claim 10, wherein, when the remediation code is not set to the automatic remediation state, the method further comprises:
   providing, by the processor, an indication that the error is associated with the first configuration setting being in the first state.

12. The method of claim 9, wherein, when the error is not associated with the first configuration setting being in the first state, the method further comprises:
   providing, by the processor, an indication that the error is not associated with the first configuration setting being in the first state.

13. The method of claim 9, wherein, prior to determining whether the error is associated with the first configuration setting being in the first state, the method further comprises:
   determining, by the processor, whether the error is associated with a hardware device of the information handling system, wherein determining whether the error is associated with the first configuration setting being in the first state is in response to determining that the error is not associated with the hardware device.

14. The method of claim 13, wherein, when the error is associated with the hardware device, the method further comprises:
   providing, by the processor, an indication that the error is associated with the hardware device.

15. The method of claim 9, wherein, if the OS failed to load, the method further comprises:
   determining, by the processor, whether the failure to load the OS is associated with a second configuration setting of the information handling system being in a third state;
   changing, when the failure to load the OS is associated with the second configuration setting being in the third state, the second configuration setting from the third state to a fourth state; and
   rebooting the information handling system.

16. An information handling system, comprising:
   a storage device to store operating system (OS) loader code, diagnostic code, and remediation code; and
   a processor configured to:
      execute the OS loader code to boot the information handling system and to determine whether the OS failed to load on the information handling system;
      execute the diagnostic code if the OS failed to load, the diagnostic code to determine whether the load failure is associated with a configuration setting of the information handling system being in a first state; and
      execute the remediation code if the error is associated with the configuration setting being in the first state, the remediation code to change the first configuration setting from the first state to a second state, and to reboot the information handling system.

* * * * *